June 11, 1968 E. C. LUNDEBERG 3,387,744
SWAGING MACHINE FEEDING APPARATUS
Filed March 2, 1967 4 Sheets-Sheet 1

INVENTOR.
EDGAR C. LUNDEBERG
BY
Lindsey, Prutzman and Hayes
ATTORNEYS

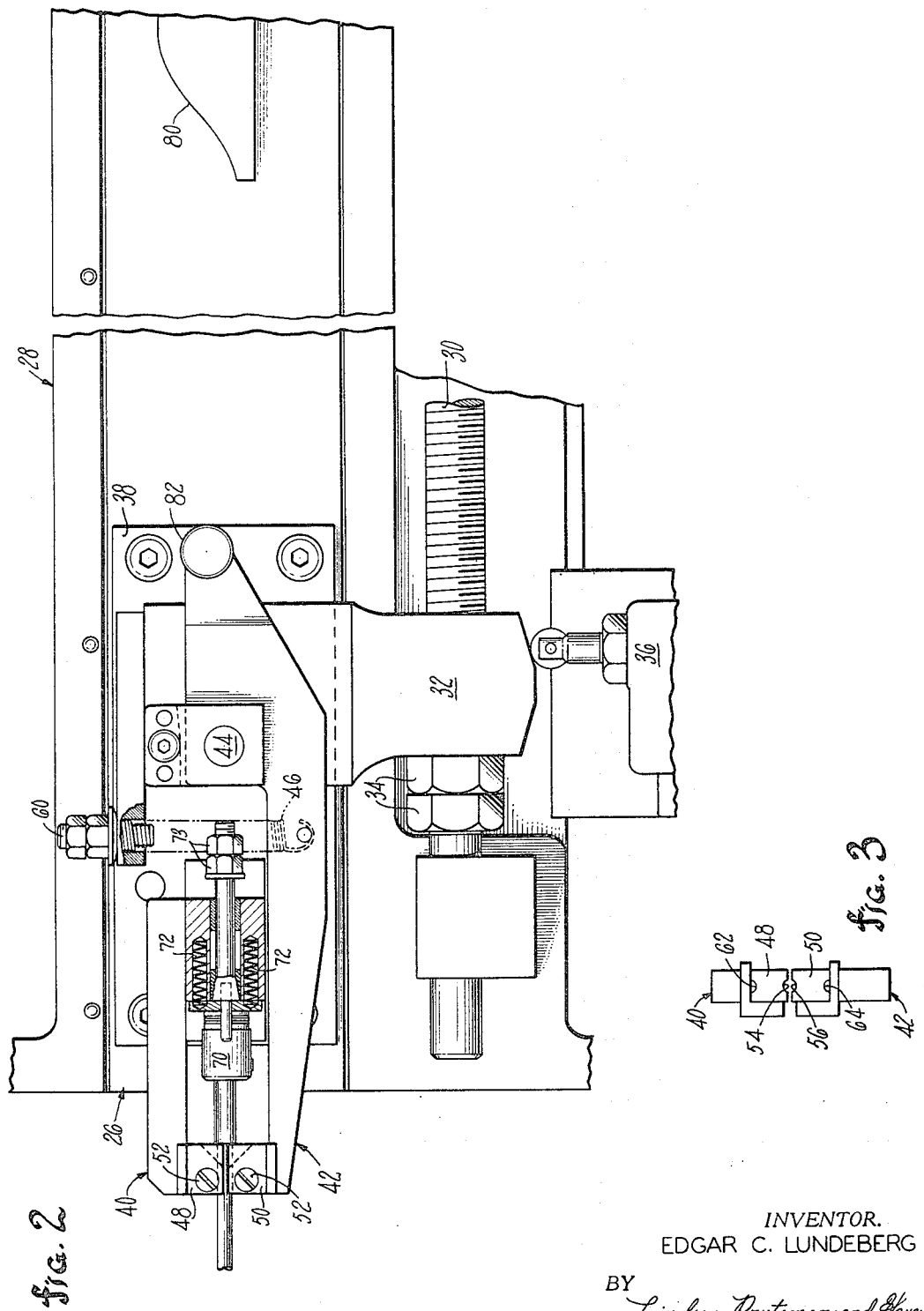

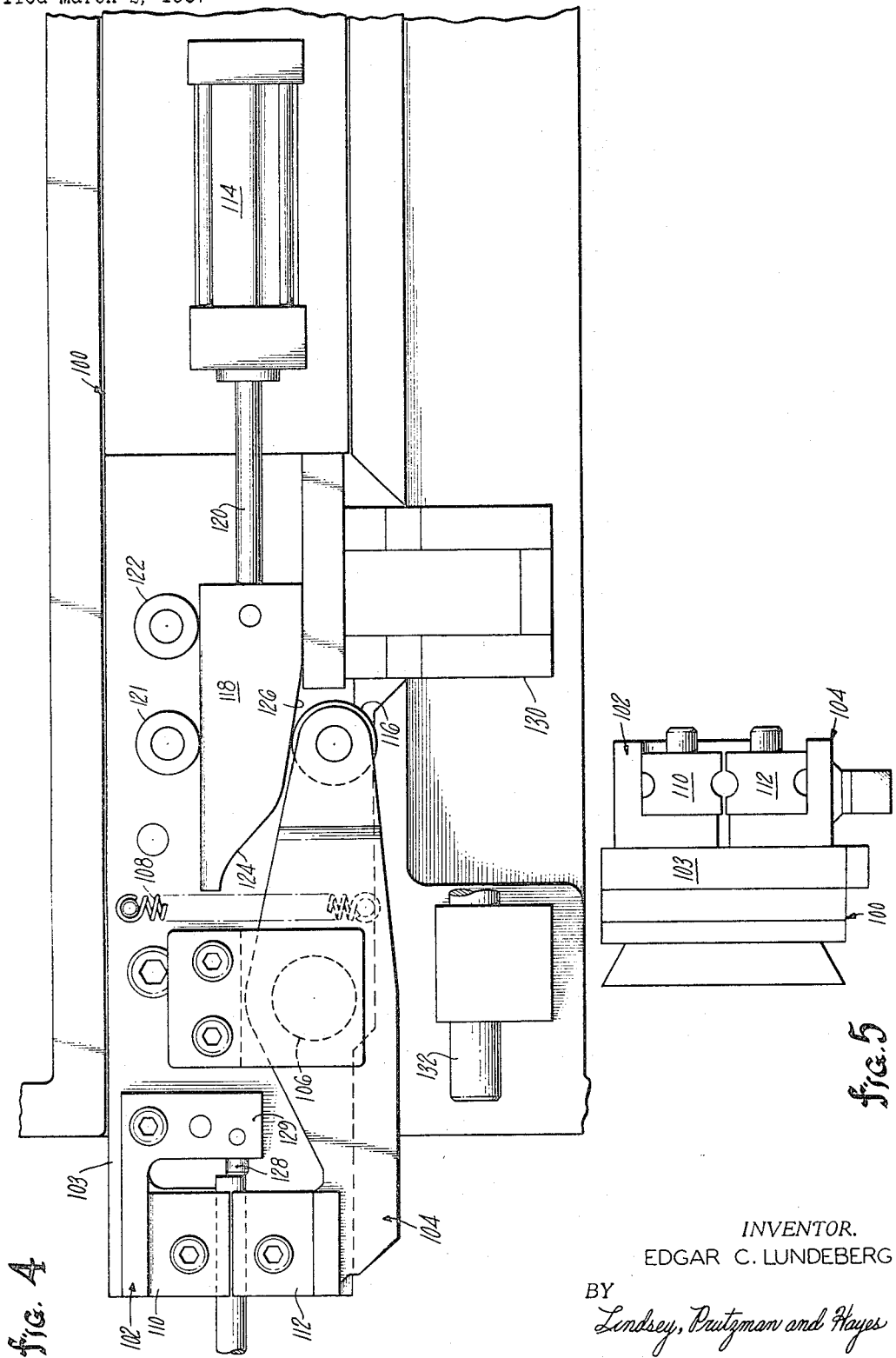

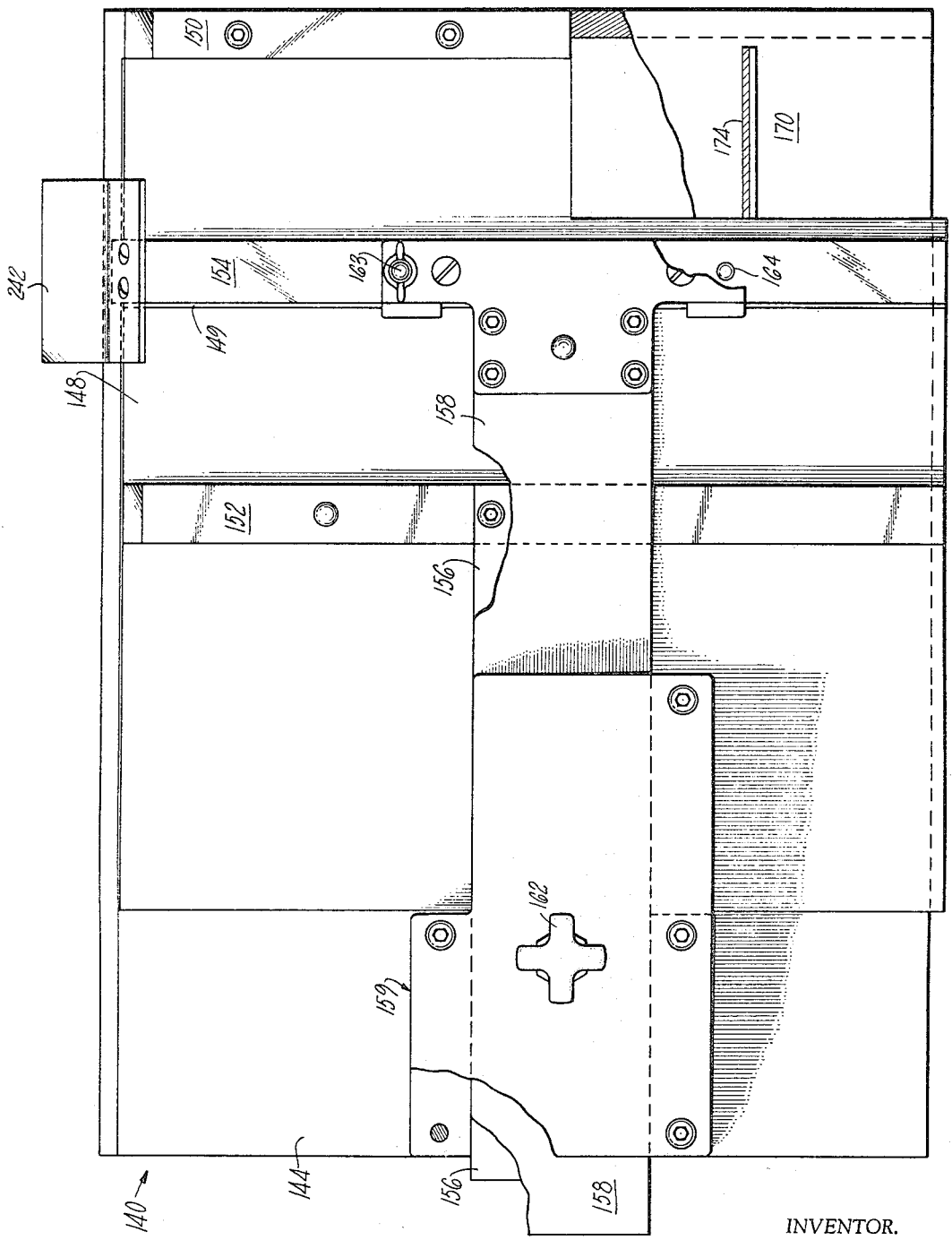

United States Patent Office 3,387,744
Patented June 11, 1968

3,387,744
SWAGING MACHINE FEEDING APPARATUS
Edgar C. Lundeberg, c/o Lundeberg Engineering Co.,
302 Murphy Road, Hartford, Conn. 06114
Filed Mar. 2, 1967, Ser. No. 620,146
15 Claims. (Cl. 221—150)

ABSTRACT OF THE DISCLOSURE

Apparatus for automatically feeding rod stock from a storage bin, one piece at a time, to a swaging machine. An oscillating rocker arm provides for delivering the stock from a bin to the upper end of an inclined magazine, and a reciprocable shuttle provides for delivering the stock from the lower end of the magazine to the gripping jaws of a ram which is reciprocably mounted to drive the stock into the swaging machine.

---

Swaging-type machine tools operate most efficiently when the stock to be worked is handled automatically and in accordance with the working cycle. Automatic handling of stock in the swaging machine tool industry has become common with respect to units that handle large tubes and rods. Units designed and built to handle small parts, at high production rates, and which incorporate both loading and ejecting mechanisms, are less common, and it is toward this end that the present invention is directed. The automatic, controlled and high speed small parts handling features of the present invention are utilizable with swaging machines of both the rotating and nonrotating-die type as for example for forming tools such as screwdrivers, chisels, soldering iron tips, bit shanks, etc.

It is an object of the present invention to provide a new and improved apparatus for automatically feeding small size stock to swaging machines.

It is another object of the present invention to provide improved apparatus for stock delivering small size stock, one piece at a time to a machine such as a swaging machine and for subsequently withdrawing the stock from the machine at the completion of the working cycle.

It is a further object of the present invention to provide improved apparatus for feeding small size rod stock which accurately delivers the stock to a machine and subsequently withdraws the stock from the machine at high speed and in step with the machine operation.

Another object of the invention is to provide improved apparatus for delivering small size rod stock to a machine which transfers the stock to the machine in a series of interrelated stages.

Another object of the invention is to provide improved apparatus for feeding small size rod stock to a swaging machine and for preheating each workpiece before it is worked by the swaging machine.

Other objects will be in part obvious and in part pointed out more in detail hereinafter.

The invention accordingly consists in the features of construction, combination of elements and arrangement of parts which are exemplified in the construction hereinafter set forth, and the scope of the application of which is indicated in the appended claims.

In the drawings:

FIG. 2 is an enlarged longitudinal view, partly broken away and partly in section, taken along line 2—2 of FIG. 1 and showing a ram of the feeding apparatus;

FIG. 3 is a reduced end view of the ram showing the upper and lower jaw assemblies of the ram;

FIG. 4 is an enlarged longitudinal view, partly broken away and partly in section, showing another embodiment of a ram which may be employed in the feeding apparatus;

FIG. 5 is an end view of the ram of FIG. 4; and

FIG. 6 is an enlarged plan view partly broken away and partly in section of a magazine of the feeding apparatus.

Figure 1:
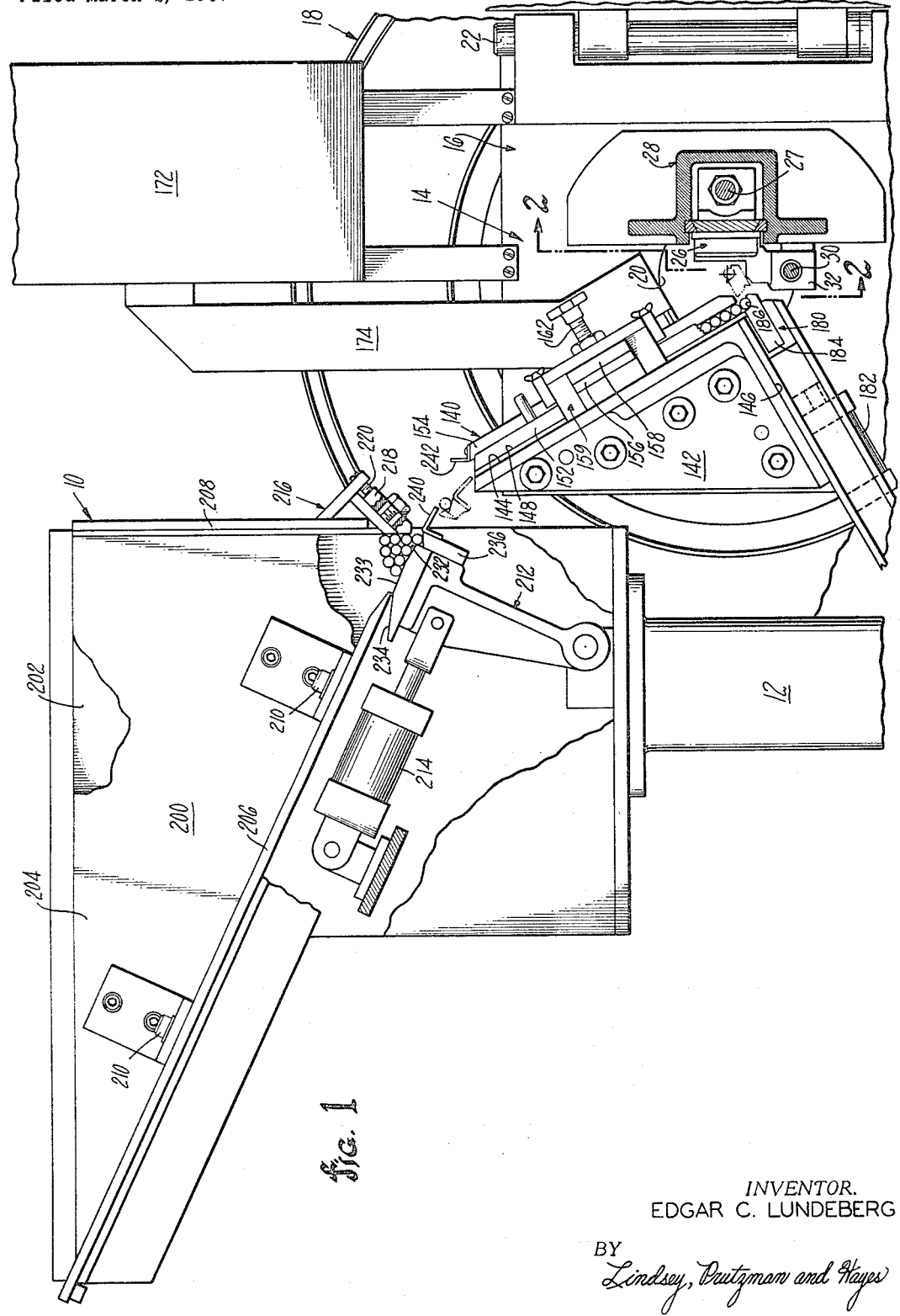
FIG. 1 is a front end view, partly broken away and partly in section, showing a swaging machine installation with an embodiment of a feeding apparatus of the present invention.

Referring now to the figures in detail an embodiment of a feeding apparatus of the present invention is shown in FIG. 1 to comprise a hopper subassembly 10 having a supporting post 12 and a feed subassembly 14 having a supporting plate 16. The hopper and feed subassemblies of the feeding apparatus are shown mounted for feeding rod stock into a swaging machine 18 of the non-rotating-die type which for example has two pairs of opposed dies which are actuated inwardly to swage the stock delivered into the central axial opening 20 of the machine.

The supporting plate 16 of the feed subassembly is mounted in appropriate axial alignment with the central opening 20 of the swaging machine as shown in FIG. 1 and is preferably hinged as with hinge pin 22 to the swaging machine so that the feed subassembly 14 can be pivoted to the side to provide access to the swaging machine. A suitable lock (not shown) is provided for locking the feed subassembly in its operative position shown in FIG. 1 with the support plate 16 parallel to the face of the swaging machine.

The feed subassembly 14 comprises a ram 26 which is mounted on an elongated ram support or guideway 28 extending outwardly of the plate 16 for rectilinear reciprocable movement parallel to the axis of the swaging machine 18. The ram 26 is reciprocated by a suitable hydraulic cylinder mounted on the ram support 28 and having a piston rod 27 (FIG. 1) connected to the ram 26, and the stroke of the ram 26 is accurately limited by a threaded rod 30 mounted on the ram support 28. For this purpose the ram has a depending arm 32 with an axial opening receiving the rod 30 and is thereby adapted to engage suitable stop nuts 34 adjustably threaded on the rod 30 for limiting the stroke of the ram. Also the rod 30 is preferably mounted for predetermined limited axial movement when engaged by the ram to help cushion the shock of deceleration. Additionally, suitable switches, such as the switch 36 (FIG. 2), are actuated as the ram is reciprocated back and forth to control the operation of the ram operating cylinder, etc.

Referring to FIGS. 2 and 3 the ram comprises a reciprocable jaw support 38, an upper jaw assembly 40 fixed to the jaw support 38 and a lower jaw assembly pivotally mounted on the jaw support 38 by a pivot pin 44 and biased upwardly to its closed position shown in FIG. 2 by a tension spring 46. The jaw assemblies 40, 42 have cooperating replaceable jaws 48, 50 respectively which are secured to the jaw supports by suitable fasteners 52. The replaceable jaws 48, 50 have opposed axially extending slots or grooves 54, 56 which are contoured in accordance with the contour of the stock employed to provide for accurately positioning and appropriately gripping the stock. In this regard the upper fixed jaw assembly 40 provides for locating the stock coaxially with the swaging machine 18 and the lower pivotal jaw assembly 42 provides for clamping the stock against the fixed jaw 48. The upper end of the tension spring 46 is mounted so that the spring tension is adjustable with a stud 60 to enable the action of the pivotal jaw assembly 42 and the gripping force of the jaws to be accurately controlled and if desired to permit the stock held by the jaws to be rotated during the forming operation, as for example when the feeding apparatus is used with a rotating-die type swaging machine. Also the jaws are designed with suitable cooperating grooves 62, 64 on their opposed parallel edges so that the jaws may be removed and remounted to use the grooves 62, 64 as for example with different size stock or when the grooves 62, 64 are excessively worn.

A stop 70 is provided rearwardly of and generally in axial alignment with the axial groove of the upper jaw to provide for axially positioning the stock on the ram and to assist in subsequently ejecting the stock from the jaws. The stop 70 is mounted for limited axial displacement against the bias of a compression spring 72 between a forward position controlled by the adjustable stop nuts 73 and a rearward position shown in FIG. 2. As the ram is actuated forwardly the rear end of the stock will bear against the stop 70 and will depress the stop against the compression spring 72 to automatically axially position the stock on the ram, as for example as a result of the engagement of the outer end of the stock with associated swaging machine stop means.

A cam 80 which is suitably mounted for axial adjustment parallel to the axis of the ram support 28 in accordance with the stroke of the ram is provided for withdrawing the pivotal jaw assembly 42 as the ram is withdrawn to its fully retracted position. For this purpose a roller 82 is mounted on the rear end of the pivotal jaw assembly 42 for engagement by the cam 80 to withdraw the pivotal jaw as the ram reaches its fully retracted position. Upon this occurrence the stock held between the jaws 48, 50 is released and a succeeding piece of stock is fed into position between the jaws and held there until the forward stroke of the ram is initiated and the lower jaw 42 is pivoted upwardly to clamp the stock in place.

Referring to FIGS. 4 and 5 another embodiment of a ram 100 utilizable with nonrotating-die or stationary-die type machines is shown comprising an upper jaw assembly 102 fixed upon a reciprocable jaw support 103 and a lower jaw assembly 104 pivotally mounted with the pivot pin 106 on the jaw support 103 and biased in the opening direction, counter-clockwise as viewed in FIG. 4, by a tension spring 108. The jaw assemblies 102, 104 have replaceable gripping jaws 110, 112 respectively like the jaws of FIGS. 2 and 3, and a separate hydraulic cylinder 114 is mounted on the jaw support 103 to provide for selectively opening and closing the lower pivotal jaw. For this purpose a roller 116 is mounted on the rear end of the pivotal jaw assembly 104 and a cam 118 is pivotally mounted on the forward end of the jaw operating cylinder piston rod 120. A pair of back-up rolls 121, 122 mounted on the jaw support 103 provide lateral support for the reciprocable cam 118, and the cam is contoured to provide a relatively steep cam portion 124 for rapidly opening and closing the lower jaw and a relatively shallow arm portion 126 for increasing the mechanical advantage of the system and thereby to develop a large jaw gripping force.

A fixed stop 128 is mounted on the jaw support 129 of the fixed jaw assembly 102 for axially positioning the stock on the ram, and the cylinder 114 is preferably actuated to close the jaws after the ram has moved forward slightly to position the stock against the stop 128.

As in the embodiment of FIG. 2 the ram has a depending arm 130 with an opening receiving a threaded rod 132 for limiting the axial stroke of the ram, and suitable switches (not shown) are provided for controlling the operation of the jaw operating cylinder 114 as well as the ram operating cylinder.

Referring particularly to FIGS. 1 and 6 a stock chute or magazine 140 is mounted on the supporting plate 16 on the opposite lateral side of the axis of the swaging machine from the ram. The magazine 140 comprises a rigid support or frame 142 which is secured to the plate 16 and which provides mutually perpendicular planar surfaces 144, 146 lying in planes parallel to and offset from the axis of the swaging machine. Stock wear plates 148, 149 are mounted on the surface 144 and as seen in FIG. 1, the wear plates 148, 149 provide a supporting surface extending downwardly at an angle of approximately 60° from well above the axis of the swaging machine to slightly below the axis of the swaging machine. The stock is guided downwardly along the wear plates by an inner fixed edge guide 150, an outer adjustable edge guide 152 and an adjustable height guide 154, the guides together providing with the wear plates 148, 149 a chute or magazine for receiving and aligning the stock. The edge guide 152 and height guide 154 are mounted on arms 156, 158 which are axially reciprocable in a fixed frame 159 such that by manually releasing a threaded locking screw 162 the guides 152, 154 may be axially adjusted in accordance with the length of stock to be employed. Also, the height guide 154 is adjustable normal to the wear plates 148, 149 by suitable fasteners 163, 164 in accordance with the size of the stock employed. Additionally, with the ram embodiment of FIG. 2, the cam 80 is preferably suitably mounted on the adjustable edge guide 152 so that the cam is automatically adjusted with the guide 152 in accordance with the length of stock employed.

A U-shaped induction heater 170 is provided at the inner axial end of the magazine to provide for heating the stock and for thereby facilitating the forming operation provided by the swaging machine 18. A suitable electrical supply box 172 is mounted on the supporting plate 16 well above the ram, and an electrical bus 174 is provided for supplying electrical power to the induction heater 170. Suitable controls (not shown) are provided for adjusting the rate at which the stock is heated by the heater 170 in accordance with the rate at which the stock is fed downwardly through the magazine and the desired stock temperature to be achieved.

A shuttle 180 is reciprocably mounted on the underside of the frame 142 for rectilinear reciprocable movement perpendicular to the axis of the swaging machine and at an angle of approximately 30°. A suitable actuating cylinder 182 is connected for reciprocating the shuttle between its withdrawn position shown in full lines in FIG. 1 and an extended position partially shown in broken lines in FIG. 1. The shuttle has a replaceable stock transfer element 184 which is formed with a pocket 186 contoured to receive and accurately retain a piece of stock while the shuttle is reciprocated from its withdrawn to its extended position. In the withdrawn position of the shuttle the pocket 186 is aligned to receive the next succeeding piece of stock from the magazine and when the shuttle is actuated to its extended position the transfer element 184 provides for closing the lower inner end of the magazine and for transferring the piece of stock supported in the pocket 186 laterally and upwardly to a position at which the stock is parallel to but immediately below the axial groove of the fixed jaw of the ram. The shuttle remains extended to retain the stock in this position until the lower jaw is pivoted to firmly grip the stock. In so pivoting the lower jaw provides for raising the stock slightly from the position in which it is supported by the transfer element 184 thus permitting the shuttle to be retracted by the actuating cylinder 182.

Referring to FIG. 1 the hopper subassembly 10 comprises a hopper or bin 200 which is formed by a fixed vertical sidewall 202, an axially adjustable vertical sidewall 204, a laterally inclined bottom wall 206 and a front wall 208. The vertical sidewall 202 is aligned with the fixed edge guide 150 of the magazine 140 and the sidewall 204 may be axially adjusted by loosening the fasteners 210 to position it in accordance with the axial length of the stock employed and substantially in alignment with the adjustable edge guide 152 of the magazine 140. It can therefore be seen that the stock is adapted to be axially positioned initially in the bin 200 appropriately with respect to the fully retracted position of the ram.

A rocker arm or carrier 212 is mounted beneath and at the lower lateral end of the bottom wall 206 of the hopper for pivotal movement about an axis parallel to the axis of the swaging machine. The rocker arm provides for individually transferring the stock from the bin 200 to the magazine 140 and for this purpose is actuated by a suitable hydraulic cylinder 214 between a withdrawn or normal position shown in full lines in FIG. 1 and an extended position partially shown in broken lines in FIG. 1. The rocker arm operating cylinder 214 may be suitably controlled in accordance with the operation of the ram to provide for transferring a piece of stock from the bin to the magazine 140 for each cycle of the ram or, alternatively, suitable sensing means (not shown) may be provided for operating the cylinder 214 to maintain the stock in the magazine 140 above a predetermined minimum.

A bracket 216 is mounted on the lower end of the front wall 208, and a hopper gate 218 is laterally adjustable on the bracket with a set screw 220 at an angle of approximately 45° to position the inner vertical and horizontal edges of the gate 218 for permitting a single piece of stock to pass between the opening defined by the gate and the withdrawn rocker arm. The rocker arm has an upper platform with three relatively inclined platform portions 232, 233 and 234. The leading platform portion 232 is adapted to cooperate with the gate 218 to permit the stock to be individually fed from the bin 200 to a carrier block 236 of the rocker arm. The intermediate platform portion 233 provides for displacing the stock upwardly in the bin and for closing off the bin opening as the rocker arm 212 is pivoted forwardly to its fully extended position. The trailing platform portion 234 provides for permitting the stock to move downwardly in the bin as the rocker arm reaches its forward position. Accordingly, as the rocker arm is oscillated between its withdrawn and extended positions the upward and downward movement of the stock in the bin accompanying this oscillation provides for ensuring appropriate alignment of the stock in the bin. Also it can be seen that a complete operating cycle of the rocker arm 212 provides for feeding a single piece of stock onto the carrier block 236.

As the rocker arm 212 is pivoted to its extended position the carrier block 236 provides for transferring a single piece of stock from the hopper to the magazine 140. The carrier 236 is preferably provided with a flat upper supporting surface for transferring the stock and as the rocker arm 212 is pivoted from its withdrawn to its extended position the supporting surface of the carrier 236 is moved from a horizontal position to an inclined position which thereby permits the stock to be transferred by the force of gravity from the rocker arm to the magazine. Also sheet metal guides 240, 242 are fixed to the carrier 236 and height guide 154 of the magazine 140 respectively to provide for appropriately guiding the stock from the rocker arm 212 to the magazine.

As will be understood from the foregoing, the apparatus of the invention provides for feeding stock automatically, successively, and at high speed, from a storage bin to a swaging machine. The feeding apparatus includes several transfer phases, i.e., from hopper to carrier to magazine to shuttle and to the positioning jaws. Also, although the feeding apparatus is disclosed in connection with a swaging machine, an installation in which the feeding apparatus has its widest utilization, no limitation of the invention to swaging machines is intended by the foregoing specification or the succeeding claims. Nor is the invention limited to handling rod stock only, which has been used solely for convenience of disclosure.

As will be apparent to persons skilled in the art, various modifications and adaptations of the structure above described will become readily apparent without departure from the spirit and scope of the invention, the scope of which is defined in the appended claims.

I claim:

1. Apparatus for controlled high speed demand handling of small size work-stock from storage to the work site of a swaging machine, comprising work-stock storage means having a discharge aperture and a gate therefor, a carrier adjacent the aperture and gate to successively obtain workpieces from the storage means, a feed magazine proximate the carrier to receive workpieces therefrom, having its load point above the axis of the swaging machine and its feed out point below the said axis, workpiece transfer means adjacent the magazine, adapted to deliver each workpiece to a point just beneath the axis of the swaging machine, and ram-mounted workpiece gripping jaws to receive each workpiece from the transfer means successively, and to present it to the work site.

2. In apparatus for high speed feeding of work-stock to a swaging machine of the class wherein mechanism transfers small size stock, one piece per swaging cycle, from storage means into approximate position as respects the machine dies or work site, and ejects each worked product, the combination therewith including a feed subassembly including a ram and a guideway therefor, a jaw support on the ram and a first workpiece gripping jaw immovably fixed thereon, a second workpiece gripping jaw positioned cooperatively on the jaw support relatively to the first jaw and disposed to pivot on the support, and spring-bias means on the ram to maintain the second jaw closed for delivery of each workpiece to the machine for working.

3. Apparatus as claimed in claim 2 to advance the ram and jaws along the guideway to deliver a workpiece into the machine tool for working, and subsequently to retreat with each worked product, cam and cam roller means associated with the second jaw to open the same to receive a workpiece.

4. Apparatus as claimed in claim 3 including ram traverse adjustment and limit means, and cam and switch mechanism to control cycling of the ram.

5. Apparatus as claimed in claim 4 including spring-biased ejector means associated with the workpiece gripping jaws to positively eject each formed product during retreat of the ram.

6. In apparatus for high speed feeding of workstock to a swaging machine of the class wherein mechanism transfers small size stock, one piece per swaging cycle, from storage means into approximate position as respects the machine dies or work site, the combination therewith including a feed subassembly including a ram guideway, a ram reciprocable on the guideway between a withdrawn position and an extended position for driving stock into and withdrawing it from the swaging machine, an upper fixed workpiece gripping jaw on the ram, a lower workpiece gripping jaw pivotally mounted on the ram between a closed position cooperating with the first jaw to grip the workpiece and an open position, spring means on the ram biasing the lower jaw in one pivotal direction, and jaw operating means for pivoting the lower jaw in the opposite pivotal direction against the bias of the spring means with the ram withdrawn from the swaging machine.

7. Apparatus as claimed in claim 6 wherein the jaw operating means is fixed for engagement with the second jaw to pivot the same in said opposite pivotal direction as the ram is reciprocated to its withdrawn position.

8. Apparatus as claimed in claim 6 wherein the jaw operating means is mounted on the ram for reciprocable movement therewith.

9. Apparatus as claimed in claim 8 in which the jaw operating means comprises an actuating cylinder and cam means operated thereby for pivoting the lower jaw in said opposite pivotal direction in step with the reciprocable movement of the ram.

10. In apparatus for high speed feeding of work-stock to a swaging machine of the class wherein mechanism including ram means transfers small size stock, one piece per swaging cycle, from storage means finally into approximate position as respects the machine dies or work site, and ejects each worked product, the combination therewith including a storage hopper for stock workpieces, a feed magazine having a gravity feed load slot therein, disposed adjacent the hopper having its load point above the axis of the swaging machine and its feed out point below the said axis, carrier means having a plurality of stock contacting surfaces and associated with the hopper to transfer workpieces from the hopper to the magazine, transfer means associated with the magazine load slot to deliver workpieces from the magazine to the ram means, and heater apparatus proximate the magazine load slot to condition stock for working by the swaging machine.

11. Apparatus as claimed in claim 10 in which the hopper has a gravity feed shelf sloping downwardly toward the feed magazine and terminating in a chamfered edge surface, a vertical end wall for the hopper terminating at its lower end with an adjustable gate, and mounting of the carrier means so that the plural surfaces thereof cooperate with the chamfered feed shelf and adjustable gate to ensure that just one workpiece leaves the hopper for delivery to the feed magazine with each delivery motion of the carrier means.

12. Apparatus as claimed in claim 11 in which there are fluid cylinder and piston means to oscillate the carrier between the hopper and the feed magazine, a guide fixed to the carrier to ensure delivery of a workpiece into the feed magazine load slot, and a guide on the magazine adjacent the load slot to further ensure that each workpiece is delivered into the load slot.

13. Apparatus as claimed in claim 12 including a reciprocating shuttle shaped to pick off from below the swaging machine axis and at the magazine load slot feed out point just one workpiece for each transfer motion of the shuttle, and fluid cylinder and piston mechanism to reciprocate the shuttle so that it delivers each workpiece to a point just beneath the axis of the swaging machine, for pick-up by the ram means.

14. Apparatus as claimed in claim 13 including means to adapt the magazine to various lengths and diameters of stock, and in which the shape of the shuttle includes pocket means for individually supporting each workpiece.

15. Apparatus as claimed in claim 10 in which the transfer means associated with the magazine load slot includes a reciprocating shuttle having a cup-like depression to receive from the magazine load slot feed out point just one workpiece for each transfer motion of the shuttle, and fluid cylinder and piston mechanism to reciprocate the shuttle so that it delivers each workpiece to a point just beneath the axis of the swaging machine, for pick-up by the ram-mounted jaws.

References Cited
UNITED STATES PATENTS

| | | | |
|---|---|---|---|
| 2,950,522 | 8/1960 | Hibbs | 221—238 |
| 2,951,401 | 9/1960 | Johnson | 221—272 X |

STANLEY H. TOLLBERG, *Primary Examiner.*